United States Patent
Hibi et al.

(10) Patent No.: US 6,276,673 B1
(45) Date of Patent: Aug. 21, 2001

(54) FLUID-FILLED ACTIVE VIBRATION DAMPING DEVICE HAVING STABILIZING MEMBER FOR STABILIZING OSCILLATING MEMBER

(75) Inventors: Masayuki Hibi, Komaki; Akio Saiki, Inuyama; Shouji Akasa; Atsushi Muramatsu, both of Komaki, all of (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/550,890

(22) Filed: Apr. 17, 2000

(30) Foreign Application Priority Data

Apr. 23, 1999 (JP) .................................................. 11-117004

(51) Int. Cl.$^7$ ..................................................... F16M 5/00
(52) U.S. Cl. ....................................................... 267/140.14
(58) Field of Search ........................... 267/140.14, 140.15

(56) References Cited

U.S. PATENT DOCUMENTS

| | | | |
|---|---|---|---|
| 4,793,599 | * 12/1988 | Ishioka | 267/140.14 |
| 5,318,283 | * 6/1994 | Weltin et al. | 267/140.14 |
| 6,105,943 | * 8/2000 | Nagasawa | 267/140.14 |

FOREIGN PATENT DOCUMENTS

| | | |
|---|---|---|
| 59-1829 | 1/1984 | (JP) . |
| 61-2939 | 1/1986 | (JP) . |
| 10-47426 | 2/1998 | (JP) . |
| 10-227329 | 8/1998 | (JP) . |
| 10-311367 | 11/1998 | (JP) . |

* cited by examiner

Primary Examiner—Matthew C. Graham
(74) Attorney, Agent, or Firm—Burr & Brown (57) ABSTRACT

A fluid-filled active vibration damping device including: (a) an elastsic body which elastically connects first and second mounting members and which partially defines a fluid chamber filled with a non-compressible fluid; (b) an oscillating member which partially defines the fluid chamber; (c) an electromagnetic actuator for oscillating the oscillating member; (d) a stabilizing member which is disposed on the side of the oscillating member that is remote from the fluid chamber, and which is opposed to and spaced apart from the oscillating member in an oscillation direction of the oscillating member; (e) first and second elastic supports through which the respective oscillating and stabilizing members are elastically supported by the second mounting member; and (f) a connecting member which connects the oscillating and stabilizing members, so as to provide a displaceable assembly which is displaceable relative to the second mounting member.

15 Claims, 1 Drawing Sheet

FLUID-FILLED ACTIVE VIBRATION DAMPING DEVICE HAVING STABILIZING MEMBER FOR STABILIZING OSCILLATING MEMBER

BACKGROUND OF THE INVENTION

1. Field of the Invention

The present invention relates in general to a fluid-filled vibration damping device having an electromagnetic actuator adapted to oscillate or displace an oscillating member which partially defines a fluid chamber formed in the vibration damping device, for controlling the pressure of a fluid in the fluid chamber, in order to actively damp vibration to be damped. More particularly, this invention is concerned with such a fluid-filled active vibration damping device which is capable of oscillating or displacing the oscillating member with high stability and efficiency and which is suitably used as an engine mount, a body mount or a cab mount for a motor vehicle, for example.

2. Discussion of the Related Art

As one type of a vibration damper or a vibration damping connector which is interposed between a vibration source and an object whose vibration is to be damped, there is known a fluid-filled active vibration damping device including: (a) a first and a second mounting member which are spaced apart from each other; (b) an elastic body which elastically connects the first and second mounting members and which partially defines a fluid chamber filled with a non-compressible fluid; (c) an oscillating member which partially defines the fluid chamber; (d) an actuator for oscillating the oscillating member; (e) a flexible diaphragm which partially defines an equilibrium chamber filled with the non-compressible fluid; and (f) means for defining an orifice passage for fluid communication between the equilibrium chamber and the fluid chamber.

In such an active vibration damping device, the oscillation or displacement of the oscillating member is controlled on the basis of characteristics of vibration, such as its frequency or amplitude, for thereby controlling the pressure of the fluid in the fluid chamber, so that the vibration is actively or positively damped. It is proposed to employ such an active vibration damping device as an engine mount for a motor vehicle, in view of its capability to provide a sufficiently high vibration damping effect with respect to vibration whose frequency and amplitude are variable.

For such an active vibration damping device to be able to stably and effectively provide a desired vibration damping effect, it is necessary that the oscillation of the oscillating member is stably and efficiently controlled. In this respect, there has been proposed an active vibration damping device as disclosed in JP-A-59-1829 and JP-A-61-2939, which has an electromagnetic actuator adapted to oscillate or displace the oscillating member. In this active vibration damping device, the oscillating member is driven by an electromagnetic force, i.e. a magnetic force generated by an electromagnet, so that the oscillation of the oscillating member is easily and accurately controlled.

However, even such an active vibration damping device equipped with the electromagnetic actuator suffers from deterioration of stability of the displacement of the oscillating member, since the oscillating member, upon displacement thereof, tends to be inclined by, for example, a force other than the electromagnetic force applied thereto by one or more other element or member of the vibration damping device, resulting in difficulty in providing a desired vibration damping effect, with high stability, irrespective of operating conditions. For solving this drawback, it is considered possible to use a guide mechanism in which the oscillating member is slidably guided by a slideway or slide bushing in an oscillation direction in which the oscillating member is displaced or oscillated, so as to prevent or minimize inclination of the oscillating member with respect to the oscillation direction. However, the sliding movement of the oscillating member on the slideway or in the slide bushing tends to generate an undesirable noise and heat due to a frictional resistance between the oscillating member and the slideway or bushing, and even deteriorate the oscillation motion of the oscillating member due to an energy loss. In this respect, the use of the electromagnetic actuator as means for oscillating the oscillating member still has a technical problem to be solved.

SUMMARY OF THE INVENTION

It is therefore an object of the present invention to provide a fluid-filled active vibration damping device having a novel structure, which elastic mount is capable of oscillating or displacing the oscillating member with high stability and efficiency, so as to effectively exhibit desired vibration-damping effect with high stability.

The present invention provides a fluid-filled active vibration damping device according to each of the following aspects, preferred forms or advantageous arrangements of the invention. It is to be understood that the following preferred forms and advantageous arrangements are provided to facilitate the understanding of possible combinations of features recited in the following preferred forms and advantageous arrangements, and that the technical features and the combinations of the technical features disclosed in the present specification are not limited to the following preferred forms and advantageous arrangements, but should be recognized based on the overall description of the specification and the drawing.

The above object may be achieved according to the principle of the present invention, which provides a fluid-filled active vibration damping device comprising: (a) a first and a second mounting member which are spaced apart from each other; (b) an elastic body which elastically connects the first and second mounting members and which partially defines a fluid chamber filled with a non-compressible fluid; (c) an oscillating member which partially defines the fluid chamber; (d) an electromagnetic actuator for oscillating the oscillating member, so as to control a pressure of the non-compressible fluid in the fluid chamber; (e) a stabilizing member which is disposed on one of opposite sides of the oscillating member that is remote from the fluid chamber, and which is opposed to and spaced apart from the oscillating member in an oscillation direction in which the oscillating member is oscillated by the electromagnetic actuator; (f) a first elastic support through which the oscillating member is elastically supported by the second mounting member such that the oscillating member is displaceable relative to the second mounting member; (g) a second elastic support through which the stabilizing member is elastically supported by the second mounting member such that the stabilizing member is displaceable relative to the second mounting member; and (h) a connecting member which connects the oscillating member and the stabilizing member, so as to cooperate with the oscillating member and the stabilizing member to provide a displaceable assembly which is displaceable relative to the second mounting member.

In the fluid-filled active vibration damping device constructed according to the invention, the oscillating member and the stabilizing member are spaced apart from each other in the oscillation direction in which the oscillating member is oscillated by the electromagnetic actuator, and are connected to each other by the connecting member so as to provide the displaceable assembly. The oscillating member and the stabilizing member are elastically supported by the second mounting through the respective first and second elastic supports. That is, the displaceable assembly is elastically supported by the second mounting member, at two portions thereof, i.e., at the oscillating member and the stabilizing member which are distant from each other in the oscillation direction. Accordingly, a positioning force applied from the first and second elastic supports acts on the two portions of the displaceable assembly which are distant from each other in the oscillation direction, thereby minimizing inclination of the oscillating member with respect to the oscillation direction or displacement of the oscillating member in a direction perpendicular to the oscillation direction, whereby the oscillation of the oscillating member is accurately controlled so that the vibration damping device exhibits desired damping characteristics with improved stability.

Owing to the arrangement in which the displaceable assembly is elastically supported by the second mounting member, at a plurality of portions thereof distant from each other in the oscillation direction, it is possible to stabilize the oscillation direction of the oscillating member without a guide mechanism as used in the prior art. Thus, the present active vibration damping device is capable of providing desired damping characteristics by efficiently oscillating the oscillating member, without conventionally experienced drawbacks such as undesirable generation of noise and heat.

The connecting member in the present vibration damping device may consist of a rigid cylindrical rod, such as a metallic pipe, or other member which is adapted to extend in the oscillation direction and connect the oscillating and stabilizing members thereby permitting these two members to be displaceable together with each other.

According to a first preferred form of the present invention, the electromagnetic actuator is disposed between the oscillating member and the stabilizing member so that the oscillating member and the stabilizing member are positioned on respective opposite sides of the electromagnetic actuator.

It is preferable that the distance between the oscillating member and the stabilizing member in the oscillation direction is made sufficiently large so as to effectively minimize inclination of the oscillating member with respect to the oscillation direction upon oscillation thereof. In the fluid-filled active vibration damping device constructed according to this first preferred form of the invention in which the oscillating member and the stabilizing member are positioned on the respective opposite sides of the electromagnetic actuator, it is possible to dispose the displaceable assembly in a space in which the electromagnetic actuator is disposed, thereby sufficiently increasing the distance between the oscillating and stabilizing members, without increasing the overall size of the damping device.

According to a second preferred form of the present invention, the fluid-filled active vibration damping device further comprises a flexible diaphragm which partially defines an equilibrium chamber filled with a non-compressible fluid and which is displaceable to permit a change in volume of the equilibrium chamber, and means for defining a first orifice passage for fluid communication between the equilibrium chamber and the fluid chamber, and wherein the flexible diaphragm is spaced apart from the displaceable assembly so that the displaceable assembly is displaceable independently of the displacement of the flexible diaphragm.

In the fluid-filled active vibration damping device constructed according to this second preferred form of the invention, the flexible diaphragm, which is displaceable or deformable upon application of a vibrational load to the damping device, is disposed without direct connection thereof with the displaceable assembly which includes the oscillating member, the stabilizing member and the connecting member. Thus, the displaceable assembly is not influenced by a force generated as a result of irregular displacement or deformation of the flexible diaphragm, whereby the oscillation motion of the oscillating member is accurately controlled with further improved stability, by controlling the electromagnetic actuator.

According to a third preferred form of the present invention, the fluid chamber includes a primary chamber which is partially defined by the elastic body so that a pressure of the non-compressible fluid in the primary chamber is changed when the elastic body is elastically deformed, and an auxiliary chamber which is partially defined by the oscillating member so that a pressure of the non-compressible fluid in the auxiliary chamber is changed when the oscillating member is displaced, the fluid-filled active vibration damping device further comprising means for defining a second orifice passage for fluid communication between the primary and auxiliary chambers.

In the fluid-filled active vibration damping device constructed according to the third preferred form of the invention, the pressure change in the auxiliary chamber caused by the oscillation or displacement of the oscillating member is transmitted to the primary fluid chamber by flows of the fluid through the second orifice passage. This arrangement makes it possible to further efficiently control the pressure in the primary fluid chamber, by utilizing resonance of the fluid flowing through the second orifice passage. The second orifice passage is preferably tuned to exhibit a high damping effect with respect to vibration whose frequency is higher than frequency to which the first orifice passage is tuned to provide a high damping effect based on the resonance of the fluid flowing therethrough, so that the vibration damping device exhibits a sufficiently high damping effect with respect to a sufficiently wide range of frequency of the input vibrations, on the basis of the resonance of the fluid flowing through the first orifice passage as well as on the basis of the resonance of the fluid flowing through the second orifice passage.

According to a third preferred form of the present invention, each of the oscillating and stabilizing members consists of a member which is made of rigid material and has a generally plate-like shape extending in a direction substantially perpendicular to the oscillation direction.

The material and shape of each of the oscillating and stabilizing members are not particularly limited, as long as these two members are connectable to each other by connecting member and supportable by the second mounting member, displaceably relative to the second mounting member. In this respect, the oscillating and stabilizing members may be members formed integrally with the respective first and second elastic supports. However, each of the oscillating and stabilizing members is preferably a member which is made of a metallic material or other rigid material and which has a generally plate-like shape extending in the direction substantially perpendicular to the oscillation direction, as described in this third preferred form of the invention, so that the pressure of the fluid in the fluid chamber is controlled by the displacement of the oscillating member with further improved efficiency, and the oscillating and stabilizing members are guided by the respective first and second elastic supports with further improved stability.

According to a fifth preferred form of the present invention, the first elastic support comprises a generally annular member which is disposed between the oscillating member and the second mounting member as viewed in a direction substantially perpendicular to the oscillation direction, and the second elastic support comprises a generally annular member which is disposed between the stabilizing member and the second mounting member as viewed in the direction substantially perpendicular to the oscillation direction.

In the fluid-filled active vibration damping device constructed according to the fifth preferred form of the invention, when the oscillating member is displaced in the oscillation direction, each of the first and second elastic supports is subjected to a shearing stress and accordingly deformed such that a portion thereof adjacent to the oscillating or stabilizing member and a portion thereof adjacent to the second mounting member are displaced in the oscillation direction away from each other. When the oscillating member is displaced in the direction substantially perpendicular to the oscillation direction, on the other hand, each of the first and second elastic supports is subjected to a compressive stress and accordingly the above-described two portions of the first or second elastic support are displaced in the substantially perpendicular direction toward each other. Accordingly, each of the first and second elastic supports can be provided with a sufficiently high degree of spring stiffness with respect to a load applied thereto in the direction substantially perpendicular to the oscillation direction and a desired degree of spring stiffness with respect to a load applied thereto in the oscillation direction, thereby minimizing displacement of the oscillating member in a direction inclined with respect the oscillation direction while allowing displacement of the oscillating member in the oscillation direction, leading to a further improved stability in the oscillation motion of the oscillating member.

According to a sixth preferred form of the present invention, the second mounting member comprises a tubular housing portion having axially opposite open ends, one of which is open toward the first mounting member and is fluid-tightly closed by the first mounting member and the elastic body which elastically connects the first mounting member and the tubular housing portion, while the other of the axially opposite open ends is fluid-tightly closed by the flexible diaphragm, and wherein the oscillating member and the stabilizing member are accommodated in the tubular housing portion such that the oscillating member and the stabilizing member are opposed to each other in an axial direction of the tubular housing portion so that the electromagnetic actuator is accommodated in the tubular housing portion, and wherein the fluid chamber is positioned between the elastic body and the oscillating member while the equilibrium chamber is positioned between the stabilizing member and the flexible diaphragm.

According to this sixth preferred form of the invention, the electromagnetic actuator can be incorporated in the second mounting member, i.e., within a main body of the vibration damping device, and the fluid chamber and the equilibrium chamber can be formed in a limited space with a simplified structure.

According to an advantageous arrangement of the sixth preferred form of the invention, the electromagnetic actuator comprises a holder block which has a generally cylindrical shape and which is fixed to the second mounting member such that the holder block is fitted in the tubular housing portion of the second mounting member, a coil which is held by the holder block, and an electromagnetically movable member which is fixed to the oscillating member and is displaceable relative to the coil in an axial direction of the coil, the electromagnetically movable member being displaced by an electromagnetic force generated upon energization of the coil with an electric current applied thereto, for thereby oscillating the oscillating member.

In the above advantageous arrangement, the holder block of the electromagnetic actuator may have at least one radial projection which is formed on an outer circumferential surface of the holder block and which circumferentially extends over a predetermined circumferential length smaller than the circumference of the holder block, so that the holder block is fitted at the above-described at least one radial projection in the tubular housing portion of the second mounting member. Further, the first orifice passage for fluid communication between the equilibrium chamber and the fluid chamber includes a restricted fluid passage which is provided by a spacing circumferentially defined by circumferentially opposite ends of the above-described at least one radial projection of the holder block.

According to a seventh preferred form of the present invention, the electromagnetic actuator comprises a holder block which is fixed to the second mounting member, a coil which is held by the holder block, and an electromagnetically movable member which is fixed to the oscillating member and is displaceable relative to the coil in an axial direction of the coil, the electromagnetically movable member being displaced by an electromagnetic force generated upon energization of the coil with an electric current applied thereto, for thereby oscillating the oscillating member.

In the fluid-filled active vibration damping device constructed according to the seventh preferred form of the invention, the electromagnetic actuator is reliably held by the second mounting member. The electromagnetically movable member may be formed of an iron material, permanent magnet or another magnetic material which is displaceable by the electromagnetic force generated by the coil with the electric current applied thereto. The electromagnetically movable member may be positioned on one of axially opposite sides of the coil with an axial spacing therebetween, or radially outwardly or inwardly of the coil with a radial spacing therebetween, so that the electromagnetically movable member is displaced by the electromagnetic force generated with application of the electric current to the coil, for thereby oscillating or displacing the oscillating member.

According to one advantageous arrangement of the seventh preferred form of the present invention, the oscillating member and the stabilizing member are elastically supported by the holder block of the electromagnetic actuator, through the first elastic support and the second elastic support, respectively. In this arrangement, the electromagnetic actuator, the oscillating and stabilizing members and the first and second elastic supports cooperate with each other to provide a single intermediate product, thereby facilitating operation for assembling the vibration damping device.

According to another advantageous arrangement of the seventh preferred form of the present invention, the holder block has a through-hole formed therethrough and extending in the axial direction of the coil in which the electromagnetically movable member is displaceable relative to the coil, and wherein the connecting member consists of a cylindrical rod which has an outside diameter smaller than an inside diameter of the through-hole and which is introduced in the through-hole such that the through-hole and the cylindrical rod are brought in a substantially coaxial relationship with each other, with a predetermined radial spacing distance therebetween, so that the displaceable assembly is displaceable without the cylindrical rod being in contact at an outer circumferential surface thereof with an inner circumferential surface of the through-hole.

BRIEF DESCRIPTION OF THE DRAWING

The above objects, features and advantages of the present invention will be better understood by reading the following detailed description of a presently preferred embodiment of the invention, when considered in connection with the accompanying drawing, in which the single FIGURE is an elevational view in transverse cross section of an engine mount according to an embodiment of this invention.

DETAILED DESCRIPTION OF THE PREFERRED EMBODIMENT

Figure 1:
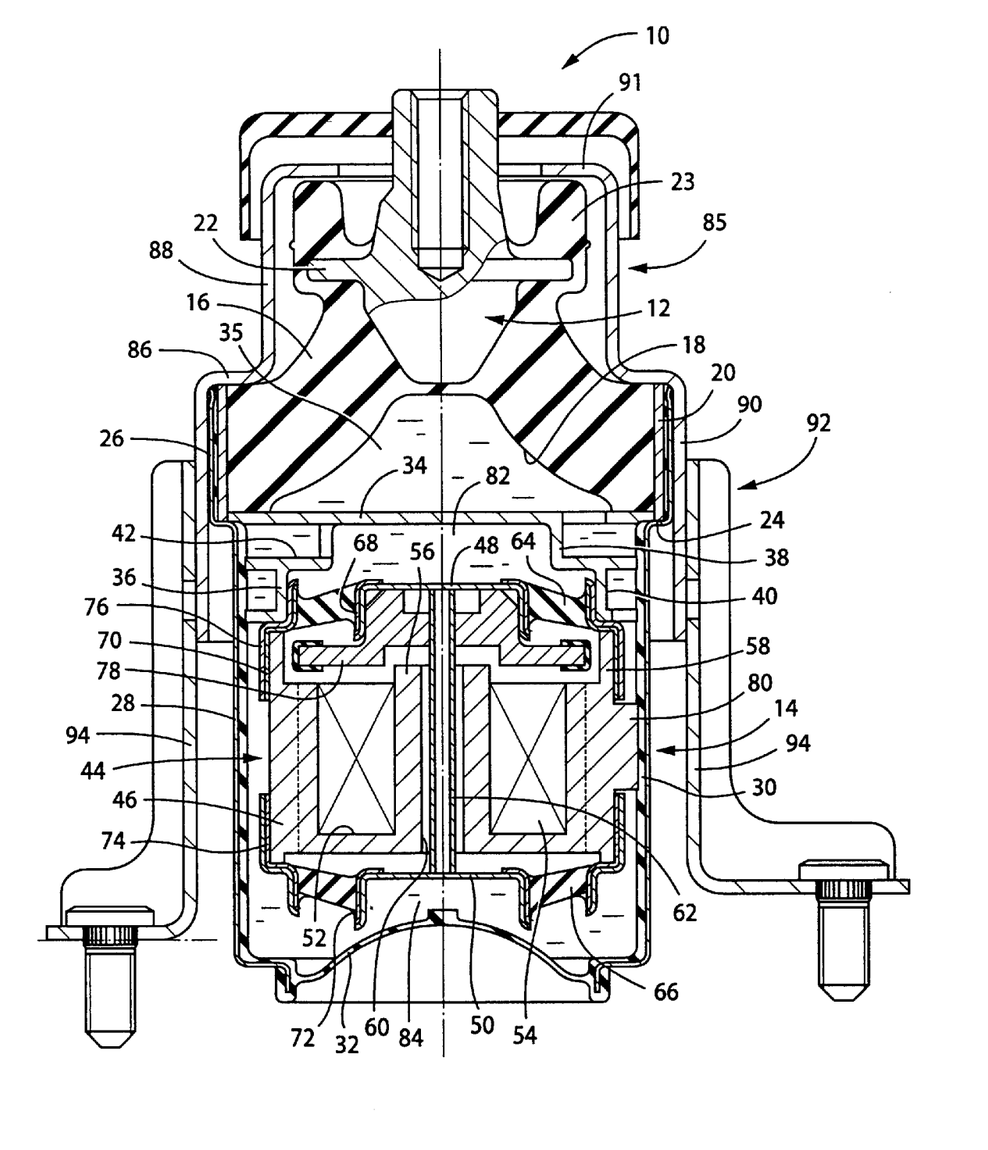

The single FIGURE in the drawing illustrates a fluid-filled active vibration damping device in the form of an engine mount 10 constructed according to an embodiment of this invention. This engine mount 10 includes a first mounting member 12 and a second mounting member 14 which are both made of metallic materials and which are disposed in mutually opposed and spaced-apart relationship with each other. These first and second mounting members 12, 14 are elastically connected to each other by an elastic body 16 made of a rubber material, and are attached to the power unit and the body of a motor vehicle, respectively, so that the power unit which includes an engine of the vehicle is mounted on the vehicle body in a vibration damping fashion. The engine mount 10 receives a vibrational load primarily in a direction in which the first and second mounting members 12, 14 are opposed to each other, i.e., in the substantially vertical direction as seen in the figure.

Described more specifically, the first mounting member 12 is a generally cylindrical solid member, and includes a generally cylindrical body portion, an axially lower, inverted-frustoconical portion whose diameter progressively decreases in the downward direction, and a flange portion 22 which is formed integrally with the cylindrical body portion and extends radially outwardly from the outer circumferential surface of the cylindrical body portion. The first mounting member 12 has a tapped hole formed so as to axially extend and open in the axially upper end face of the first mounting member 12, so that the first mounting member 12 is attached to the power unit (not shown) through a suitable bolt which is screwed into the tapped hole.

The elastic body 16 is a generally frustoconical member, and has a conical recess 18 formed in an end face of its axially lower large-diameter portion. The first mounting member 12 is bonded to the elastic body 16 in a process of vulcanization of a rubber material for forming the elastic body 16, such that the first mounting member 12 is held in a substantially coaxial relationship with the elastic body 16, and such that the axially lower, inverted-frustoconical portion of the first mounting member 12 is embedded in the axially upper small-diameter portion of the elastic body 16. A tubular-shaped sleeve 20 made of a metallic material is also bonded to the elastic body 16 in the above-described process, such that the tubular-shaped sleeve 20 is mounted on an outer circumferential surface of the axially lower large-diameter portion of the elastic body 16. The elastic body 16 cooperates with the first mounting member 12 and the tubular-shaped sleeve 20 to constitute an integral intermediate assembly. It is noted that the elastic body 16 includes a stop portion 23 which has a generally annular shape and extends axially upwardly from the flange portion 22 of the first mounting member 12.

The second mounting member 14 is a generally stepped tubular member, and has axially opposite open ends. The second mounting member 14 has an axially intermediate shoulder portion 24, an axially upper large-diameter portion 26 located on the axially upper side of the shoulder portion 24, and an axially lower small-diameter portion 28 located on the lower side of the shoulder portion 24. The second mounting member 14 is covered at a substantially entire inner circumferential surface thereof by a thin-walled seal layer 30 which is made of a rubber material. The axially lower open end of the second mounting member 14 is fluid-tightly closed by a generally thin-walled, inverted-cup-shaped diaphragm 32 which is made of the same material as the seal layer 30 and is formed integrally with the seal layer 30. In a process of vulcanization of a rubber material for forming the seal layer 30 and the diaphragm 32, the seal layer 30 is bonded to the inner circumferential surface of the second mounting member 14, while the diaphragm 32 is bonded at its outer peripheral portion to a peripheral portion of the axially lower open end of the second mounting member 14.

The large-diameter portion 26 of the second mounting member 14 is press-fitted onto the tubular-shaped sleeve 20, or is mounted onto the sleeve 20 and then subjected to a drawing operation in which the diameter of the large-diameter portion 26 is reduced, so that the second mounting member 14 is fixed relative to the outer circumferential surface of the axially lower large-diameter portion of the elastic body 16, and so that the axially upper open end of the second mounting member 14 is fluid-tightly closed by the elastic body 16. The first and second mounting members 12, 14 are held in substantially coaxial and axially-spaced-apart relationship with each other, and are elastically connected to each other by the elastic body 16.

Within an interior space of the generally tubular-shaped second mounting member 14, there is disposed a partition member 34 which is provided by a rigid member made of a synthetic resin or a metallic material. The partition member 34 is a generally inverted-cup-shaped member, and consists of an orifice-defining circumferential wall portion and a bottom wall portion. The partition member 34 is positioned in the axially intermediate portion of the second mounting member 14, namely, between the elastic body 16 and the diaphragm 32 as viewed in the axial direction of the second mounting member 14. The partition member 34 is disposed to extend generally in the radial direction of the second mounting member 14, and is gripped at an outer peripheral portion of the bottom wall portion thereof, by and between the shoulder portion 24 of the second mounting member 14 and the end face of the axially lower large-diameter portion of the elastic body 16, so that the partition member 34 is fixedly positioned with respect to the second mounting member 14, whereby the interior space of the first mounting member 12 is fluid-tightly divided by the partition member 34 into two sections on the axially opposite sides of the partition member 34. One of the two sections, which is located on the upper side of the partition member 34 and is partially defined by the elastic body 16, serves as a primary fluid chamber 35 which is filled with a non-compressible fluid. Upon application of vibrational load between the first and second mounting members 12, 14, the pressure of the fluid in the primary fluid chamber 35 varies due to elastic deformation of the elastic body 16.

The non-compressible fluid may be selected from among water, alkylene glycol, polyalkylene glycol, silicone oil, or a mixture of two or more of them. In the present embodiment, however, a fluid having a low viscosity of not more than 0.1 IPa•s is preferably used as the non-compressible fluid in order to obtain an excellent vibration-damping effect based on resonance of the fluid. The primary fluid chamber 35 may be filled with the non-compressible fluid, by assembling the second mounting member 14 with the above-described integral intermediate assembly within a mass of the non-compressible fluid contained in a suitable vessel.

The partition member 34 has a first groove 36 and a second groove 38 which are formed in an outer circumferential surface of the orifice-defining circumferential wall portion thereof and open in the outer circumferential surface. The first and second grooves 36, 38 extend in a circumferential direction of the partition member 34, and are arranged in an axial direction of the partition member 34. Bottom surfaces of the first and second grooves 36, 38 provide an inner circumferential surface of the orifice-defining circumferential wall portion of the partition member 34. The first groove 36 is positioned on the axially lower side of the second groove 38, and has a depth (a dimension as measured in the radial direction of the partition member 34) smaller than that of the second groove 38 so as to have a cross sectional area smaller than that of the second groove 38. The first and second grooves 36, 38 are fluid-tightly closed at their openings by the inner circumferential surface of the small-diameter portion 28 of the second mounting member 14, so as to provide respective first and second orifice passages 40, 42 each of which extends in the circumferential direction over a predetermined circumferential length. In the present embodiment, the second orifice passage 42 has a ratio A/L larger than that of the first orifice passage 40, wherein "A" and "L" represent the cross sectional area and the length of each orifice passage 40, 42, respectively. That is, the second orifice passage 42 is tuned to effectively damp vibrations having relatively high frequencies while the first orifice passage 40 is tuned to effectively damp vibrations having relatively low frequencies, as described below in detail.

Within the interior space of the small-diameter portion 28 of the second mounting member 14, a pressure-control unit 44 is disposed so as to be positioned below the partition member 34. The pressure control unit 44 includes an oscillating member 48, a stabilizing member 50 and a holder block 46. The oscillating member 48 and the stabilizing member 50 are held by the holder block 46 such that the oscillating member 48 and the stabilizing member 50 are displaceable relative to the holder block 46. The holder block 46 is a generally cylindrical solid member made of a rigid material, preferably, a magnetic material such as an iron material. The holder block 46 has, in its center, a through-hole 60 formed therethrough and extending in an axial direction of the holder block 46.

The holder block 46 further has an annular groove 52 which is formed in an axially upper end face of the holder block 46 so as to open in the axially upper end face. The annular groove 52 extends in a circumferential direction of the holder block 46, and is positioned radially outwardly of the through-hole 60 with a substantially coaxial relationship with the through-hole 60. The annular groove 52 is defined by a cylindrical central portion 56 of the holder block 46 and an outer circumferential wall portion 58 of the holder block 46 which are opposed to each other in the radial direction. The cylindrical central portion 56 defines the radially inner circumferential surface of the annular groove 52, while the outer circumferential wall portion 58 defines the radially outer circumferential surface of the annular groove 52. The central portion 56 and the outer circumferential wall portion 58 have respective height dimensions, i.e., dimensions as measured in the axial direction. A coil 54 is accommodated in the annular groove 52, and is fixed to the holder block 46, so as to be positioned radially outwardly of the through-hole 60.

The oscillating member 48 is disposed on one of axially opposite sides of the holder block 46 (on the axially upper side of the holder block 46 as viewed in the figure) such that the oscillating member 48 is opposed to and spaced apart from the holder block 46 in the axial direction, with a predetermined axial spacing distance therebetween. Similarly, the stabilizing member 50 is disposed on the other side of the holder block 46 (on the axially lower side of the holder block 46 as viewed in the figure) such that the stabilizing member 50 is opposed to and spaced apart from the holder block 46 in the axial direction, with a predetermined axial spacing distance therebetween. Each of the oscillating and stabilizing members 48, 50 is an inverted-cup-shaped member, and is disposed such that its bottom wall extends in the radial direction of the holder block 46. On the oscillating member 48, there is fixedly superposed an electromagnetically movable member 78 made of an iron or other magnetic material and having a stepped cylindrical or disc-like shape. The movable member 78 has an axially upper small-diameter portion and an axially lower large-diameter portion. The movable member 78 is press-fitted at its axially upper small-diameter portion in the inverted-cup-shaped oscillating member 48, such that the movable member 78 partly projects from the oscillating member 48 downwardly in the axial direction and also outwardly in the radial direction. In the present embodiment, the holder block 46, the coil 54 and the movable member 78 cooperate with each other to constitute an electromagnetic actuator.

The oscillating member 48 and the stabilizing member 50 are connected to each other by a connecting member in the form of a connecting rod 62 which is a cylindrical hollow member made of a metallic material or other rigid material. The connecting rod 62 has an outside diameter smaller than an inside diameter of the through-hole 60 of the holder block 46, and an axial length larger than that of the through-hole 60. The connecting rod 62 is introduced in the through-hole 60 such that the through-hole 60 and the connecting rod 62 are brought in a substantially coaxial relationship with each other, with a predetermined radial spacing distance therebetween, namely, without the outer circumferential surface of the connecting rod 62 brought in contact with the inner circumferential surface of the through-hole 60, and such that an axially upper end portion of the connecting rod 62 protrudes upwardly from the through-hole 60 while an axially lower end portion of the connecting rod 62 protrudes downwardly from the though-hole 60. The axially upper end portion of the connecting rod 62 is press-fitted in a central hole formed through the movable member 78 and is fixed to a central portion of the bottom wall of the oscillating member 48. The axially lower end portion of the connecting rod 62 is fixed to a central portion of the bottom wall of the stabilizing member 50. Thus, the oscillating member 48 and the stabilizing member 50 are firmly connected to each other through the connecting rod 62, so that the connecting rod 62 cooperates with the oscillating member 48, the stabilizing member 50 and the movable member 78 to provide a displaceable assembly which is displaceable relative to the holder block 46.

The oscillating member 48 is elastically supported by the holder block 46 through a first annular elastic support 64, which is disposed between the oscillating member 48 and the holder block 46. Similarly, the stabilizing member 50 is elastically supported by the holder block 46 through a second annular elastic support 66, which is disposed between the stabilizing member 50 and the holder block 46. Each of the first and second annular elastic supports 64, 66 is a thick-walled, annular-shaped member made of a rubber material. Inner and outer fitting rings 68, 70 are bonded to the inner and outer circumferential surfaces of the first annular elastic support 64, respectively, in a process of vulcanization of the rubber material for forming the first annular elastic support 64. Similarly, inner and outer fitting rings 72, 74 are bonded to the inner and outer circumferential surfaces of the second annular elastic support 66, respectively, in a process of vulcanization of the rubber material for forming the second annular elastic support 66. It is noted that each of these fitting rings 68, 70, 72, 74 is made of a metallic material.

The inner fitting ring 68 is fitted on the outer circumferential surface of the circumferential wall of the inverted-cup-shaped oscillating member 48, while the outer fitting ring 70 is fitted on the outer circumferential surface of the axially upper end portion of the holder block 46, whereby the oscillating member 48 is elastically connected to and supported by the holder block 46 through the first annular elastic support 64. The inner fitting ring 72 is fitted on the outer circumferential surface of the circumferential wall of the inverted-cup-shaped stabilizing member 50, while the outer fitting ring 74 is fitted on the outer circumferential surface of the axially lower end portion of the holder block 46, whereby the stabilizing member 50 is elastically connected to and supported by the holder block 46 through the second annular elastic support 66. In the axially opposite end portions of the holder block 46, there are provided generally annular-shaped reinforcing members 76, 76 made of respective metallic materials. The reinforcing members 76, 76 are press-fitted on the outer circumferential surfaces of the outer fitting rings 70, 74, respectively, for increasing the strength of the outer fitting rings 70, 74.

In the above-described arrangement in which the oscillating member 48 and the stabilizing member 50 are attached to the holder block 46 through the first and second annular elastic supports 64, 66, respectively, a spacing or gap between the oscillating member 48 and one of axially opposite ends of the holder block 46 is fluid-tightly closed by the first annular elastic support 64, while a spacing or gap between the stabilizing member 50 and the other axial end of the holder block 46 is fluid-tightly closed by the second annular elastic support 66. Accordingly, the holder block 46, the oscillating member 48, the stabilizing member 50 and the first and second annular elastic supports 64, 66 cooperate with each other to define an internal space of the pressure control unit 44, which internal space is fluid-tightly isolated from the exterior of the pressure control unit 44. This internal space of the pressure control unit 44 includes a portion between the holder block 46 and the oscillating member 48 that are axially opposed to each other, a portion between the holder block 46 and the stabilizing member 50 that are axially opposed to each other, a portion provided by the annular groove 52 and a portion provided by the through-hole 60.

The oscillating member 48 and the stabilizing member 50, which are fixed to the respective axially opposite end portions of the connecting rod 62, are elastically supported by the holder block 46 through the first and second annular elastic supports 64, 66, respectively, so that the above-described displaceable assembly provided by the oscillating member 48, the stabilizing member 50 and the connecting rod 62 is displaceable relative to the holder block 46 owing to elastic deformation of the first and second annular elastic supports 64, 66. Thus, the oscillating member 48 and the stabilizing member 50 are positioned on the respective axially opposite sides of the holder block 46 such that the members 48, 50 are spaced apart from the holder block 46, and are displaceable relative to the holder block 46 owing to the elastic deformation of the first and second annular elastic supports 64, 66. The electromagnetically movable member 78, which is fixed to the oscillating member 48, is positioned on the axially upper side of the holder block 46 in which the coil 54 is fixedly disposed, such that the movable member 78 is opposed to and spaced apart from the holder block 46 in the axial direction. The movable member 78 is covered at its outer peripheral portion with a thin rubber layer, so that the movable member 78 is protected from being damaged due to abutting contact thereof with the holder block 46 or other member. In the present embodiment, the movable member 78 is positioned relative to the holder block 46 in the radial direction such that at least a portion of the movable member 78 is opposed to the opening of the annular groove 52, i.e., a radial gap between the central portion 56 and the outer circumferential wall portion 58 of the holder block 46.

In the pressure control unit 44 constructed as described above, the holder block 46 accommodating the coil 54 therein serves as a yoke so as to be magnetized upon energization of the coil 54 with an electric current applied thereto, and generates an electromagnetic force which attracts the electromagnetically movable member 78 in a direction toward the holder block 46, i.e., in the downward direction, whereby the movable member 78 is downwardly displaced. In the present embodiment, a magnetic gap is provided by the annular groove 52 in which the coil 54 is accommodated and which is open in the axially upper end face of the holder block 46 that is opposed to the movable member 78, so that the generated electromagnetic force effectively acts on the movable member 78. Accordingly, the frequency and amplitude of oscillation of the oscillating member 48 can be accurately controlled by controlling the frequency and amount of the electric current to be applied to the coil 54.

The pressure control unit 44 is introduced into the small-diameter portion 28 of the second mounting member 14, and the outer fitting ring 70 is press-fitted into the bottom surface of the first groove 36 of the partition member 34, i.e., into the inner circumferential surface of the axially lower end portion of the inverted-cup-shaped partition member 34, with a high degree of fluid tightness between the outer fitting ring 70 and the inner circumferential surface of the partition member 34, so that the pressure control unit 44 is positioned between the partition member 34 and the diaphragm 32, in a substantially coaxial relationship with the second mounting member 14. The holder block 46 has a radially-projecting portion 80 which is formed on the outer circumferential surface of the axially intermediate portion thereof and which engages the inner circumferential surface of the second mounting member 14 so as to prevent displacement of the pressure control unit 44 relative to the second mounting member 14 in the radial direction. The radially-projecting portion 80 may consist of a single projection which extends in the circumferential direction over a predetermined circumferential length smaller than the circumference of the holder block 46, or alternatively, may consist of a plurality of arcuate projections which are spaced apart from each other in the circumferential direction. The provision of the radially-projecting portion 80 in the holder block 46 contributes to reliable positioning of the holder block 46 relative to second mounting member 14 in the radial direction.

For assembling the engine mount 10 of the present embodiment, for example, the pressure control unit 44 is first attached to the partition member 34, and the pressure control unit 44 and the partition member 34 attached to each other are introduced into the second mounting member 14. Then, the above-described integral intermediate assembly constituted by the first mounting member 12 and the elastic body 16 is attached to the second mounting member 14. It is preferable that the small-diameter portion 28 of the second mounting member 14 is subjected to a drawing operation in which the diameter of the small-diameter portion 28 is reduced, after the pressure control unit 44 and the partition member 34 have been introduced into the second mounting member 14, so that the holder block 46 is firmly fixed to the second mounting member 14.

Between the oscillating member 48 and the partition member 34 which engages the axially upper end portion of the holder block 46, there is formed an auxiliary fluid chamber 82 which is partially defined by the oscillating member 48 and the orifice-defining circumferential wall portion of the partition member 34 in which the first and second grooves 36, 38 are formed. The oscillation or displacement of the oscillating member 48 causes a change in a pressure of the fluid in the auxiliary fluid chamber 82. This pressure change in the auxiliary fluid chamber 82 is transmitted to the primary fluid chamber 35 by flows of the fluid through the second orifice passage 42 which communicates with the primary and auxiliary fluid chambers 35, 82. In the present embodiment, the cross sectional area and the length of the second orifice passage 42 are determined so that the engine mount 10 exhibits a high damping effect, for example, with respect to medium-frequency vibrations such as engine idling vibrations, on the basis of the resonance of the fluid flowing through the second orifice passages 42, so that the pressure change in the auxiliary fluid chamber 82 is efficiently transmitted to the primary fluid chamber 35. It is noted that, in the present embodiment, the primary and auxiliary fluid chambers 35, 82 cooperate with each other to constitute a fluid chamber.

Within the small-diameter portion 28 of the second mounting member 14, there is formed an equilibrium chamber 84 which has an axially-extending portion located on the radially outer side of the pressure control unit 44 and a radially-extending portion located on the axially lower side of the pressure control unit 44. The equilibrium chamber 84 is formed independently of the primary and auxiliary fluid chambers 35, 82, but communicates with the auxiliary fluid chamber 82 through the first orifice passage 40, and communicates with the primary fluid chamber 35 through the first orifice passage 40, the auxiliary fluid chamber 82 and the second orifice passage 42. It is noted that the first orifice passage 40 includes a restricted fluid passage which is provided by a spacing defined by circumferentially opposite ends of the radial projection or projections 80 of the holder block 46.

The equilibrium chamber 84 is partially defined by the diaphragm 32 so that the elastic deformation of the diaphragm 32 permits a change of the volume of the equilibrium chamber 84. The elastic deformation of the diaphragm 32 prevents a change in the pressure of the fluid in the equilibrium chamber 84, even upon displacement of the stabilizing member 50 and the second annular elastic support 66 which also define the equilibrium chamber 84.

On the axially upper part of the engine mount 10, there is mounted a generally tubular-shaped stop member 85 which is made of a metallic material, as shown in the figure. The stop member 85 is fitted on the axially upper large-diameter portion 26 of the second mounting member 14, so as to be fixed to the second mounting member 14. The stop member 85 has an axially intermediate shoulder portion 86, an axially upper small-diameter portion 88 located on the axially upper side of the shoulder portion 86, and an axially lower large-diameter portion 90 located on the lower side of the shoulder portion 86. The stop member 85 further has an integrally-formed, annular radial projection 91 which extends radially inwardly over a predetermined radial distance from the axially upper open end of the stop member 85 and which extends circumferentially over the entire circumference of the stop member 85. The stop member 85 is positioned relative to the first mounting member 12 such that the annular radial projection 91 is opposed to and spaced apart from the flange portion 22 of the first mounting member 12 in the axial direction. The stop portion 23 of the elastic body 16, which is provided in the flange portion 22, is brought in abutting contact with the annular radial projection 91 of the stop member 85, for limiting the amount of displacement of the first mounting member 12 relative to the second mounting member 14 in a rebounding direction, i.e., in a direction away from the second mounting member 14, for example, when an excessively large vibrational load is applied to the engine mount 10.

On the outer circumferential surface of the axially lower large-diameter portion 90 of the stop member 85, there is fitted a bracket 92, with or without welding of the bracket 92 to the stop member 85. The bracket 92 has a plurality of mounting stays 94 each of which projects axially downwardly from the large-diameter portion 90 of the stop member 85 and projects radially outwardly from its axially lower end. The bracket 92 is bolted at the mounting stays 94 to the vehicle body, so that the stop member 85 or the second mounting member 14 is fixed relative to the vehicle body.

For the engine mount 10 of the present embodiment to be able to provide a desired vibration damping effect, for example, the frequency and amplitude of the electric current to be applied to the coil 54 is controlled by a know control device, so as to correspond to those of the vibration to be damped, so that the electromagnetic force acting on the electromagnetically movable member 78 or the oscillating member 48 is controlled, whereby the oscillating member 48 is suitably oscillated. The pressure change in the auxiliary fluid chamber 82, which is caused by the oscillation of the oscillating member 48, is transmitted to the primary fluid chamber 35 by flows of the fluid through the second orifice passage 42, so that the engine mount 10 exhibits a sufficiently high vibration damping effect with respect to the vibration.

In the engine mount 10 of the present embodiment, the oscillating member 48 and the stabilizing member 50 are connected to each other through the connecting rod 62, so as to be oscillated or displaced together with each other. The oscillating member 48 and the stabilizing member 50 are elastically supported by the second mounting member 14 through the respective first and second elastic supports 64, 66 which serve to limit the displacement of the oscillating and stabilizing members 48, 50 relative to the second mounting member 14. The annular-shaped first and second elastic supports 64, 66 extend radially outwardly from the outer circumferential surfaces of the respective oscillating and stabilizing members 48, 50. Thus, each of the first and second elastic supports 64, 66 is provided with a relatively high degree of spring stiffness with respect to a load applied thereto in the radial direction and a relatively low degree of spring stiffness with respect to a load applied thereto in the axial direction. That is, the ratio of the radial spring stiffness to the axial spring stiffness of each of the elastic supports 64, 66 is sufficiently high so as to minimize displacement of the oscillating and stabilizing members 48, 50 in the radial direction while allowing displacement of the oscillating and stabilizing members 48, 50 in the axial direction, i.e., the oscillation direction, whereby the oscillating member 48 is oscillated in the oscillation direction with improved stability.

Owing to the stabilized oscillation motion of the oscillating member 48, the fluid pressure change in the primary fluid chamber 35 is accurately controlled by controlling the electric current to be applied to the coil 54. Further, since the oscillating member 48 is guided by the first and second elastic supports 64, 66 in the oscillation direction, it is not necessary to use a slideway or slide bushing, which would cause an undesirable noise generation or an energy loss due to a frictional resistance to the sliding movement of the oscillating member on the slideway or in the slide bushing.

In the present engine mount 10 in which the oscillating member 48 and the stabilizing member 50 are positioned on the respective opposite sides of the electromagnetic actuator constituted by the holder block 46, the coil 54 and the movable member 78, it is possible to sufficiently increase the distance between the oscillating and stabilizing members 48, 50 in the oscillation direction, without reducing a space available for the disposition of the electromagnetic actuator, and without increasing the overall size of the pressure control unit 44. Owing to the sufficiently increased distance between the oscillating member 48 and the stabilizing member 50, the oscillating member 48 is guided by the first and second elastic supports 64, 66 with further improved stability.

In the present engine mount 10, the fluid is forced to flow through the first orifice passage 40 between the primary fluid chamber 35 and the equilibrium chamber 84, based on the pressure difference between the two chambers 35, 84 caused upon application of the vibrational load to the engine mount 10, so that the vibration is passively damped on the basis of the resonance of the fluid flowing through the first orifice passage 40. The first orifice passage 40 is tuned such that the engine mount 10 exhibits a sufficiently high damping effect, on the basis of the resonance of the fluid flowing through the first orifice passage 40, with respect to a vibration, such as engine shakes, whose frequency and amplitude are lower and larger than those of a vibration which is actively damped by controlling the fluid pressure in the fluid chamber.

In the present engine mount 10, the flexible diaphragm 32 is disposed to be spaced apart from the oscillating member 48, the stabilizing member 50 and the connecting member 62 which cooperate to provide the displaceable assembly so as to be displaceable together with each other. That is, the flexible diaphragm 32 is not directly connected to the displaceable assembly. Accordingly, the displaceable assembly is not influenced by a force generated by deformation of the flexible diaphragm, whereby the oscillation motion of the oscillating member 48 is accurately controlled with further improved stability.

While the presently preferred embodiment of this invention has been described in detail, for illustrative purpose only, it is to be understood that the present invention is not limited to the details of the illustrated embodiment, but may be otherwise embodied.

In the above-described engine mount 10, for example, the electromagnetically movable member 78 is displaced by the electromagnetic force generated upon energization of the coil 54 with the electric current applied thereto, so that the oscillating member 48 is displaced or oscillated together with the electromagnetically movable member 78 which is fixed to the oscillating member 48. However, this arrangement may be modified such that a coil and a permanent magnet are attached to one and the other of the oscillating member and the second mounting member, so that the oscillating member is oscillated by an electromagnetic force generated with an electric current applied to the coil. In this modified arrangement, the permanent magnet may consist of a cylindrical member so as to be attached to the second mounting member, while the coil may be received in a portion of the oscillating member so as to be radially inwardly or outwardly of the permanent magnet with a radial spacing between therebetween.

The partition member 34 is not essential, and may be eliminated. In the absence of the partition member 34, the primary and auxiliary fluid chambers 35, 82 cooperate to constitute a single fluid chamber.

The configurations and dimensions of the first and second orifice passages may be suitably modified depending upon desired damping characteristics and desired construction of the engine mount.

The principle of the invention is also applicable to an engine mount which is suitably used for a front-engine front-drive motor vehicle and in which the first mounting member consists of an inner sleeve while the second mounting member includes an outer sleeve disposed radially outwardly of the inner sleeve and connected to the inner sleeve by the elastic body that is radially interposed between the inner and outer sleeves.

While the above-illustrated embodiment of this invention takes the form of the engine mount for a motor vehicle, the principle of the invention is equally applicable to various types of vibration damping devices such as a body mount or differential mount for a motor vehicle, and also to vibration damping devices used in apparatus and equipment other than the motor vehicles.

It is to be understood that the present invention may be embodied with various other changes, modifications and improvements, which may occur to those skilled in the art, without departing from the spirit and scope of the invention defined by the following claims:

What is claimed is:

1. A fluid-filled active vibration damping device comprising:

a first and a second mounting member which are spaced apart from each other;

an elastic body which elastically connects said first and second mounting members and which partially defines a fluid chamber filled with a non-compressible fluid;

an oscillating member which partially defines said fluid chamber;

an electromagnetic actuator for oscillating said oscillating member, so as to control a pressure of said non-compressible fluid in said fluid chamber;

a stabilizing member which is disposed on one of opposite sides of said oscillating member that is remote from said fluid chamber, and which is opposed to and spaced apart from said oscillating member in an oscillation direction in which said oscillating member is oscillated by said electromagnetic actuator;

a first elastic support through which said oscillating member is elastically supported by said second mounting member, such that said oscillating member is displaceable relative to said second mounting member;

a second elastic support through which said stabilizing member is elastically supported by said second mounting member, such that said stabilizing member is displaceable relative to said second mounting member; and a connecting member which connects said oscillating member and said stabilizing member, so as to cooperate with said oscillating member and said stabilizing member to provide a displaceable assembly which is displaceable relative to said second mounting member, wherein said electromagnetic actuator comprises a holder block which is fixed to said second mounting member, a coil which is held by said holder block, and an electromagnetically movable member which is fixed to said oscillating member and is displaceable relative to said coil in an axial direction of said coil, said electromagnetically movable member being displaced by an electromagnetic force generated upon energization of said coil with an electric current applied thereto, for thereby oscillating said oscillating member, and wherein said holder block has a through-hole formed therethrough and extending in said axial direction of said coil in which said electromagnetically movable member is displaceable relative to said coil, and wherein said connecting member consists of a cylindrical rod which has an outside diameter smaller than an inside diameter of said through-hole and which is introduced in said through-hole such that said through-hole and said cylindrical rod are brought in a substantially coaxial relationship with each other, with a predetermined radial spacing distance therebetween, so that said displaceable assembly is displaceable without said cylindrical rod being in contact at an outer circumferential surface thereof with an inner circumferential surface of said through-hole.

2. A fluid-filled active vibration damping device according to claim 1, wherein said electromagnetic actuator is disposed between said oscillating member and said stabilizing member so that said oscillating member and said stabilizing member are positioned on respective opposite sides of said electromagnetic actuator.

3. A fluid-filled active vibration damping device according to claim 1, further comprising a flexible diaphragm which partially defines an equilibrium chamber filled with said non-compressible fluid and which is displaceable to permit a change in volume of said equilibrium chamber, and means for defining a first orifice passage for fluid communication between said equilibrium chamber and said fluid chamber, and wherein said flexible diaphragm is spaced apart from said displaceable assembly so that said displaceable assembly is displaceable independently of the displacement of said flexible diaphragm.

4. A fluid-filled active vibration damping device according to claim 2, further comprising a flexible diaphragm which partially defines an equilibrium chamber filled with said non-compressible fluid and which is displaceable to permit a change in volume of said equilibrium chamber, and means for defining a first orifice passage for fluid communication between said equilibrium chamber and said fluid chamber, and wherein said flexible diaphragm is spaced apart from said displaceable assembly so that said displaceable assembly is displaceable independently of the displacement of said flexible diaphragm.

5. A fluid-filled active vibration damping device according to claim 4, wherein said first elastic support comprises a generally annular member which is disposed between said oscillating member and said second mounting member as viewed in a direction substantially perpendicular to said oscillation direction, and said second elastic support comprises a generally annular member which is disposed between said stabilizing member and said second mounting member as viewed in said direction substantially perpendicular to said oscillation direction.

6. A fluid-filled active vibration damping device according to claim 4, wherein said electromagnetic actuator comprises a holder block which is fixed to said second mounting member, a coil which is held by said holder block, and an electromagnetically movable member which is fixed to said oscillating member and is displaceable relative to said coil in an axial direction of said coil, said electromagnetically movable member being displaced by an electromagnetic force generated upon energization of said coil with an electric current applied thereto, for thereby oscillating said oscillating member.

7. A fluid-filled active vibration damping device according to claim 6, wherein said oscillating member and said stabilizing member are elastically supported by said holder block of said electromagnetic actuator, through said first elastic support and said second elastic support, respectively.

8. A fluid-filled active vibration damping device comprising:

a first and a second mounting member which are spaced apart from each other;

an elastic body which elastically connects said first and second mounting members and which partially defines a fluid chamber filled with a non-compressible fluid;

an oscillating member which partially defines said fluid chamber;

an electromagnetic actuator for oscillating said oscillating member, so as to control a pressure of said non-compressible fluid in said fluid chamber;

a stabilizing member which is disposed on one of opposite sides of said oscillating member that is remote from said fluid chamber, and which is opposed to and spaced apart from said oscillating member in an oscillation direction in which said oscillating member is oscillated by said electromagnetic actuator;

a first elastic support through which said oscillating member is elastically supported by said second mounting member, such that said oscillating member is displaceable relative to said second mounting member;

a second elastic support through which said stabilizing member is elastically supported by said second mounting member, such that said stabilizing member is displaceable relative to said second mounting member; and a connecting member which connects said oscillating member and said stabilizing member, so as to cooperate with said oscillating member and said stabilizing member to provide a displaceable assembly which is displaceable relative to said second mounting member;

wherein said electromagnetic actuator is disposed between said oscillating member and said stabilizing member so that said oscillating member and said stabilizing member are positioned on respective opposite sides of said electromagnetic actuator, wherein said fluid-filled active vibration damping device further comprises a flexible diaphragm which partially defines an equilibrium chamber filled with said non-compressible fluid and which is displaceable to permit a change in volume of said equilibrium chamber, and means for defining a first orifice passage for fluid communication between said equilibrium chamber and said fluid chamber, and wherein said flexible diaphragm is spaced apart from said displaceable assembly so that said displaceable assembly is displaceable independently of the displacement of said flexible diaphragm;

and wherein said fluid chamber includes a primary chamber which is partially defined by said elastic body so that a pressure of said non-compressible fluid in said primary chamber is changed when said elastic body is elastically deformed and an auxiliary chamber which is partially defined by said oscillating member so that a pressure of said non-compressible fluid in said auxiliary chamber is changed when said oscillating member is displaced, said fluid-filled active vibration damping device further comprising means for defining a second orifice passage for fluid communication between said primary and auxiliary chambers.

9. A fluid-filled active vibration damping device according to claim 1, wherein each of said oscillating and stabilizing members consists of a member which is made of a rigid material and which has a generally plate-like shape extending in a direction substantially perpendicular to said oscillation direction.

10. A fluid-filled active vibration damping device according to claim 8, wherein said electromagnetic actuator comprises a holder block which is fixed to said second mounting member, a coil which is held by said holder block, and an electromagnetically movable member which is fixed to said oscillating member and is displaceable relative to said coil in an axial direction of said coil, said electromagnetically movable member being displaced by an electromagnetic force generated upon energization of said coil with an electric current applied thereto, for thereby oscillating said oscillating member.

11. A fluid-filled active vibration damping device according to claim 8, wherein said first elastic support comprises a generally annular member which is disposed between said oscillating member and said second mounting member as viewed in a direction substantially perpendicular to said oscillation direction, and said second elastic support comprises a generally annular member which is disposed between said stabilizing member and said second mounting member as viewed in said direction substantially perpendicular to said oscillation direction.

12. A fluid-filled active vibration damping device comprising:

a first and a second mounting member which are spaced apart from each other;

an elastic body which elastically connects said first and second mounting members and which partially defines a fluid chamber filled with a non-compressible fluid;

an oscillating member which partially defines said fluid chamber;

an electromagnetic actuator for oscillating said oscillating member, so as to control a pressure of said non-compressible fluid in said fluid chamber;

a stabilizing member which is disposed on one of opposite sides of said oscillating member that is remote from said fluid chamber, and which is opposed to and spaced apart from said oscillating member in an oscillation direction in which said oscillating member is oscillated by said electromagnetic actuator;

a first elastic support through which said oscillating member is elastically supported by said second mounting member, such that said oscillating member is displaceable relative to said second mounting member;

a second elastic support through which said stabilizing member is elastically supported by said second mounting member, such that said stabilizing member is displaceable relative to said second mounting member; and a connecting member which connects said oscillating member and said stabilizing member, so as to cooperate with said oscillating member and said stabilizing member to provide a displaceable assembly which is displaceable relative to said second mounting member, wherein said electromagnetic actuator is disposed between said oscillating member and said stabilizing member so that said oscillating member and said stabilizing member are positioned on respective opposite sides of said electromagnetic actuator, wherein said fluid-filled active vibration damping device further comprises a flexible diaphragm which partially defines an equilibrium chamber filled with said non-compressible fluid and which is displaceable to permit a change in volume of said equilibrium chamber, and means for defining a first orifice passage for fluid communication between said equilibrium chamber and said fluid chamber, and wherein said flexible diaphragm is spaced apart from said displaceable assembly so that said displaceable assembly is displaceable independently of the displacement of said flexible diaphragm, and wherein said second mounting member comprises a tubular housing portion having axially opposite open ends, one of which is open toward said first mounting member and is fluid-tightly closed by said first mounting member and said elastic body which elastically connects said first mounting member and said tubular housing portion, while the other of said axially opposite open ends is fluid-tightly closed by said flexible diaphragm, and wherein said oscillating member and said stabilizing member are accommodated in said tubular housing portion such that said oscillating member and said stabilizing member are opposed to each other in an axial direction of said tubular housing portion so that said electromagnetic actuator is accommodated in said tubular housing portion, and wherein said fluid chamber is positioned between said elastic body and said oscillating member while said equilibrium chamber is positioned between said stabilizing member and said flexible diaphragm.

13. A fluid-filled active vibration damping device according to claim 12, wherein said electromagnetic actuator comprises a holder block which has a generally cylindrical shape and which is fixed to said second mounting member such that said holder block is fitted in said tubular housing portion of said second mounting member, a coil which is held by said holder block, and an electromagnetically movable member which is fixed to said oscillating member and is displaceable relative to said coil in an axial direction of said coil, said electromagnetically movable member being displaced by an electromagnetic force generated upon energization of said coil with an electric current applied thereto, for thereby oscillating said oscillating member.

14. A fluid-filled active vibration damping device according to claim 13, wherein said holder block of said electromagnetic actuator has at least one radial projection which is formed on an outer circumferential surface of said holder block and which circumferentially extends over a predetermined circumferential length smaller than the circumference of said holder block, so that said holder block is fitted at said at least one radial projection in said tubular housing portion of said second mounting member, and wherein said first orifice passage for fluid communication between said equilibrium chamber and said fluid chamber includes a restricted fluid passage which is provided by a spacing defined by circumferentially opposite ends of said at least one radial projection of said holder block.

15. A fluid-filled active vibration damping device comprising:
- a first and a second mounting member which are spaced apart from each other;
- an elastic body which elastically connects said first and second mounting members and which partially defines a fluid chamber filled with a non-compressible fluid;
- an oscillating member which partially defines said fluid chamber;
- an electromagnetic actuator for oscillating said oscillating member, so as to control a pressure of said non-compressible fluid in said fluid chamber;
- a stabilizing member which is disposed on one of opposite sides of said oscillating member that is remote from said fluid chamber, and which is opposed to and spaced apart from said oscillating member in an oscillation direction in which said oscillating member is oscillated by said electromagnetic actuator;
- a first elastic support through which said oscillating member is elastically supported by said second mounting member, such that said oscillating member is displaceable relative to said second mounting member;
- a second elastic support through which said stabilizing member is elastically supported by said second mounting member, such that said stabilizing member is displaceable relative to said second mounting member; and
- a connecting member which connects said oscillating member and said stabilizing member, so as to cooperate with said oscillating member and said stabilizing member to provide a displaceable assembly which is displaceable relative to said second mounting member, wherein said electromagnetic actuator comprises a holder block which is fixed to said second mounting member, a coil which is held by said holder block, and an electromagnetically movable member which is fixed to said oscillating member and is displaceable relative to said coil in an axial direction of said coil, said electromagnetically movable member being displaced by an electromagnetic force generated upon energization of said coil with an electric current applied thereto, for thereby oscillating said oscillating member, wherein said electromagnetically movable member is spaced apart from said holder block in said oscillation direction, and wherein said holder block has a groove which accommodates said coil therein and which is open in a face of said holder block that is opposed to said electromagnetically movable member in said oscillation direction.

* * * * *